(12) United States Patent
Ninose

(10) Patent No.: US 7,895,395 B2
(45) Date of Patent: Feb. 22, 2011

(54) MANAGING LOGICAL VOLUMES IN A STORAGE SYSTEM WITH REMOTE COPY

(75) Inventor: Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 12/007,462

(22) Filed: Jan. 10, 2008

(65) Prior Publication Data

US 2008/0270695 A1    Oct. 30, 2008

(30) Foreign Application Priority Data

Apr. 24, 2007    (JP) .............................. 2007-114275

(51) Int. Cl.
*G06F 12/00* (2006.01)

(52) U.S. Cl. ........................ 711/114; 711/163; 711/203; 709/214

(58) Field of Classification Search ................... 711/114
See application file for complete search history.

(56) References Cited

U.S. PATENT DOCUMENTS

2006/0064466 A1*  3/2006  Shiga et al. .................. 709/214

FOREIGN PATENT DOCUMENTS

JP        2006-092054       9/2004

* cited by examiner

*Primary Examiner*—Yong Choe
(74) *Attorney, Agent, or Firm*—Volpe and Koenig, P.C.

(57) ABSTRACT

A storage system includes a plurality of storage apparatuses respectively connected to a host apparatus via a network. A disk controller of each storage apparatus has DKC identifying information for recognizing itself, a logical device identifier created based thereon, and a virtual/logical device identifier set containing a real/logical device identifier and a virtual/logical device identifier. The storage apparatus defined with a pair relationship creates a virtual/logical device identifier set of a mirrored image relationship by replacing its own real/logical device identifier and using it as its own virtual/logical device identifier.

13 Claims, 13 Drawing Sheets

FIG.12A
| DKC IDENTIFYING INFORMATION | VIRTUAL LDEV ID SET | |
|---|---|---|
| aa | bb#02 | cc#03 |
| | cc#03 | aa#01 |
FIG.12B
| VIRTUAL LDEV ID SET | |
|---|---|
| bb#02 | cc#03 |
| cc#03 | aa#01 |
FIG.12C
| VIRTUAL LDEV ID SET | |
|---|---|
| bb#02 | cc#03 |
| bb#02 | aa#01 |
AUXILIARY SERVER
--------------------------------
STORAGE
FIG.12D
| VIRTUAL LDEV ID SET | |
|---|---|
| aa#01 | bb#02 |

MANAGING LOGICAL VOLUMES IN A STORAGE SYSTEM WITH REMOTE COPY

CROSS REFERENCES

This application relates to and claims priority from Japanese Patent Application No. 2007-114275, filed on Apr. 24, 2007, the entire disclosure of which is incorporated herein by reference.

BACKGROUND

1. Field of the Invention

The present invention generally relates to a storage system and its management method, and particularly relates to technology of managing the logical volumes in a storage system adopting remote copy.

2. Related Art

In order to prevent the loss of data caused by failure of a storage apparatus, data stored in a certain logical volume of the storage apparatus is usually backed up in a logical volume of a physically separate storage apparatus configured redundantly. As this kind of backup technology, for instance, there is technology known as remote copy (or remote mirroring). The remote copy technology manages data by copying data synchronously or asynchronously between a logical volume in a primary storage apparatus and a logical volume in a backup storage apparatus defined as having a pair relationship therewith. Thereby, even if a failure occurs in the primary storage apparatus, the backup storage apparatus is able to succeed the I/O access requests from applications in the host apparatus.

Further, even when changing the system configuration as a result of the existing storage apparatus being insufficient in terms of capacity or function and it is necessary to replace this with a new storage apparatus, or newly add a separate storage apparatus, data stored in a certain logical volume in the storage apparatus must be migrated to another logical volume.

In the foregoing case, particularly with large-scale computer systems, "nondisruptive operation" of switching the storage apparatus (or its logical volume) without disrupting the execution of applications in the host apparatus is demanded. The host apparatus comprises a mechanism for switching the I/O access path in a state of "nondisruptive operation" of applications.

For instance, Japanese Patent Laid-Open Publication No. 2006-92054 discloses technology for changing the storage apparatus to be I/O accessed by the host apparatus without disrupting applications. Specifically, in a system including an initiator and a target, a first device having a target instructs a second device to create a target having an identifier that is the same as the identifier given to its own target. Subsequently, the initiator uses the same identifier as the one used in the communication path established with the first device to establish a communication path with the target created in the second device. The first device thereafter cuts off the communication path between its own target and the initiator, and the initiator uses the communication path established with the second device to continue the communication with the target having the same identifier.

In a storage system using the remote copy technology, when a pair relationship is defined between logical volumes in a storage apparatus, the same identifier is given to the logical volumes. Thus, the host apparatus is able to switch from a certain logical volume of the I/O access destination to another logical volume without disrupting the execution of applications with the switching function of the I/O access path.

Today, when the migration (copy) of data between logical volumes in a pair relationship is complete and such pair relationship is thereafter cancelled due to changes in the system configuration or the like, the logical volume of the migration source must continue to use the identifier of the logical volume of the migration source under conditions of nondisruptive operation of applications. Further, if a logical volume of the migration source no longer having a pair relationship uses the logical volume of the migration source, there will be contradictions in the system configuration due to conflict of identifiers, and the host apparatus will not be able to properly recognize the logical volume in the storage system.

SUMMARY

Thus, the present invention proposes a mechanism where, when a pair relationship between a copy source logical volume and a copy destination logical volume is cancelled in a storage system using remote copy, the host apparatus is able to recognize the copy source logical volume as a new and independent logical volume in the storage system.

According to one aspect of the present invention, provided is a storage system including at least a plurality of storage apparatuses respectively connected to a host apparatus via a network. Each of the plurality of storage apparatuses comprises a disk drive for forming a logical device allocated with a logical volume to be I/O accessed by the host apparatus, and a disk controller for controlling the disk drive. Each of the disk controllers includes identifying information for identifying itself, a logical device identifier created based on the identifying information so that the host apparatus can recognize the logical device, and a virtual/logical device identifier set containing a real/logical device identifier and a virtual/logical device identifier. The storage apparatus defined with a pair relationship among the plurality of storage apparatuses creates a virtual/logical device identifier set of a mirrored image relationship by replacing its own real/logical device identifier and using it as its own virtual/logical device identifier.

Here, a virtual/logical device identifier set of a mirrored image relationship refers to the real/logical device identifier and the virtual/logical device identifier of one virtual/logical device identifier set respectively corresponding to the virtual/logical device identifier and the real/logical device identifier in the other virtual/logical device identifier set.

Specifically, the present invention provides a storage system including at least a first storage apparatus and a second storage apparatus respectively connected to a host apparatus via a network. The first storage apparatus comprises a first disk drive for forming a first logical device allocated with a first logical volume to be I/O accessed by the host apparatus, and a first disk controller for controlling the first disk drive. The first disk controller includes first identifying information for identifying itself, a first logical device identifier created based on the first identifying information so that the host apparatus can recognize the first logical device, and a first virtual/logical device identifier set containing a first real/logical device identifier and a first virtual/logical device identifier. The second storage apparatus comprise a second disk drive for forming a second logical device allocated with a second logical volume, and a second disk controller for controlling the second disk drive. The second disk controller includes second identifying information for identifying itself, a second logical device identifier created based on the second identifying information so that the host apparatus can recognize the second logical device, and a second virtual/logical device identifier set containing a second real/logical device identifier and a second virtual/logical device identifier. The first real/logical device identifier and the first virtual/logical device identifier in the first virtual/logical device identifier set respectively correspond to the second virtual/logical device identifier and the second real/virtual/logical device identifier in the second virtual/logical device identifier set.

According to one aspect of the present invention, provided is a storage system further comprising an auxiliary server connected to the first storage apparatus and the second storage apparatus. At least either the first disk controller or the second disk controller sends to the auxiliary server a logical device identifier acquisition request for acquiring a new logical device identifier available on the network containing the identifying information of itself. The auxiliary server collects virtual/logical device identifier sets of disk controllers of other storage apparatuses from the storage apparatuses that have not sent the logical device identifier acquisition request on the network according to the logical device identifier acquisition request, creates a new virtual/logical device identifier set based on the identifying information contained in the logical device identifier acquisition request and the collected virtual/logical device identifier set, and sends the created virtual/logical device identifier set to any one of the disk controllers that sent the logical device identifier acquisition request according to the foregoing logical device identifier acquisition request.

According to one aspect of the present invention, provided is a management method of a storage system including at least a first storage apparatus and a second storage apparatus respectively connected to a host apparatus via a network. The first storage apparatus comprises a first disk drive for forming a first logical device allocated with a first logical volume to be I/O accessed by the host apparatus, and a first disk controller having first identifying information for identifying itself, and for controlling the first disk drive. Further, the second storage apparatus comprises a second disk drive for forming a second logical device allocated with a second logical volume, and a second disk controller having second identifying information for identifying itself, and for controlling the second disk drive. The storage system management method comprises a step of the first disk controller creating a first logical device identifier based on the first identifying information, a step of the first disk controller creating a first virtual/logical device identifier set containing a real/logical device identifier and a virtual/logical device identifier for the first logical volume and the second logical volume to be to which a pair relationship is defined in remote copy, a step of the first disk controller setting the created first logical device identifier as a real/logical device identifier in the first virtual/logical device identifier set, a step of the first disk controller sending the created first logical device identifier to the second disk controller, a step of the first disk controller receiving a second logical device identifier sent from the second disk controller based on the sent first logical device identifier, and a step of the first disk controller setting the received second logical device identifier to a virtual/logical device identifier in the first virtual/logical device identifier set.

According to the present invention, even when a pair relationship between a primary logical volume and a backup logical volume in remote copy is cancelled, since a new and unique identifier is allocated to the logical volume that was a primary logical volume, the host apparatus is able to perform I/O access to such logical volume without disrupting the execution of applications.

DESCRIPTION OF DRAWINGS

FIG. 12A to FIG. 12D are diagrams explaining the process of creating the virtual LDEV ID set in the auxiliary server according to an embodiment of the present invention.

DETAILED DESCRIPTION

Embodiments of the present invention are now explained with reference to the attached drawings.

Figure 1:
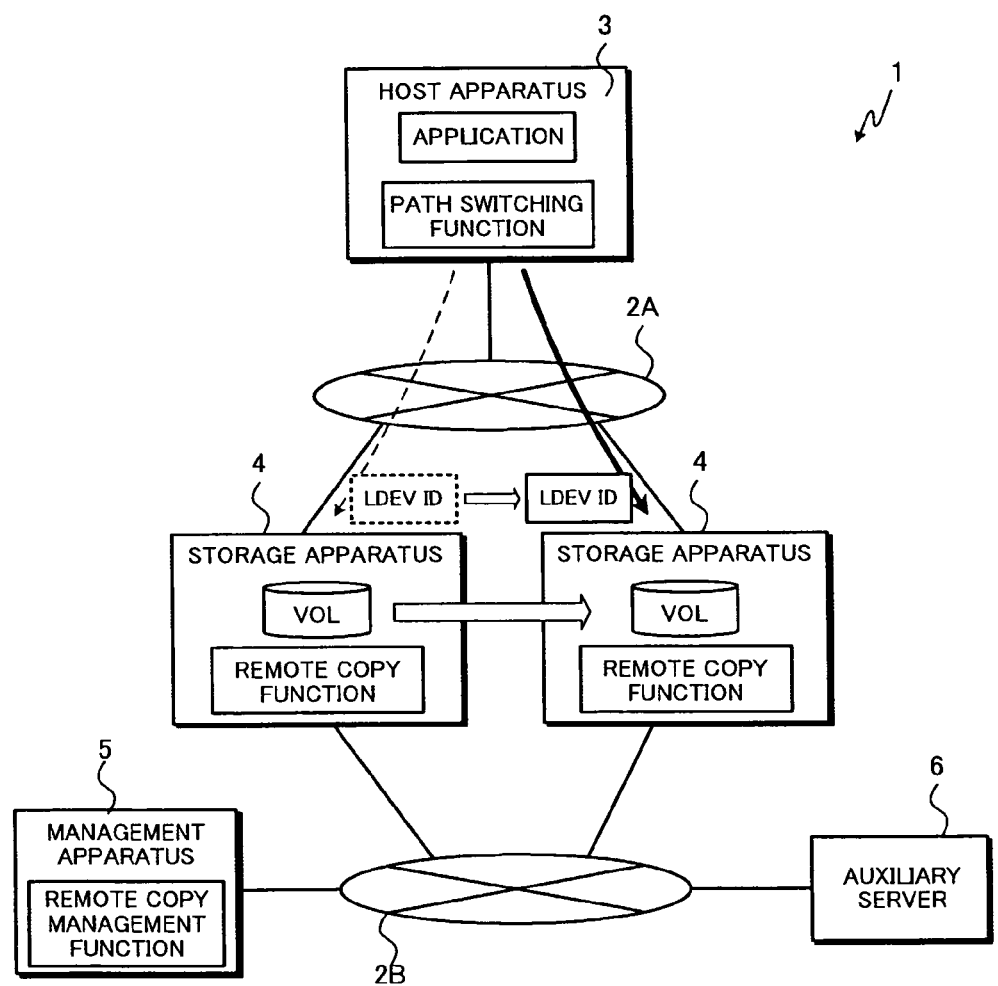
FIG. 1 is a diagram showing the overall configuration of a computer system according to an embodiment of the present invention.

FIG. 1 is a diagram showing the overall configuration of a computer system 1 according to an embodiment of the present invention. As shown in FIG. 1, the computer system 1 comprises a storage system including a host apparatus 3 and a plurality of storage apparatuses 4 connected via an I/O network 2A, and, for instance, is configured as an ATM system of banks or a seat reservation system of airline companies. The plurality of storage apparatuses 4 are mutually connected via a management network 2B. The computer system 1 also comprises a management device 5 and an auxiliary server 6 connected to the management network 2B.

The I/O network 2A is primarily used for communication based on the I/O access between the host apparatus 3 and the storage apparatus 4. The I/O network 2A, for instance, is a LAN, Internet or SAN (Storage Area Network), is configured to include a network switch, a hub or the like. In this embodiment, the I/O network 2 is configured as a fibre channel protocol based SAN (FC-SAN). However, the network 2A is not limited thereto, and may also be configured as a TCP/IP based SAN (IP-SAN).

The management network 2B is used for communication upon the management device 5 managing the storage apparatuses 4. In this embodiment, the management network 2B is also used for the communication between the storage apparatuses 4 and the auxiliary server 6. Although the I/O network 2A and the management network 2B are illustrated as different components in FIG. 1, these may also be configured as a single network. In this specification, when it is not necessary to differentiate the two components, these will be represented simply as a network 2.

The host apparatus 3, for instance, is the core computer of an ATM system of banks or a seat reservation system of airline companies. Specifically, the host apparatus 3 comprises hardware resources such as a processor, a main memory, a communication interface, and local I/O devices such as a keyboard and a display, and software resources such as a device driver, operating system (OS), application and so on. The host apparatus 3 is thereby able to realize desired processing by executing various programs under the control of the processor in coordination with the hardware resources. For example, by execution business application programs in the OS under the control of the processor, the host apparatus 3 is able to I/O access the storage apparatuses 4 and realize the desired business system as explained in detail below.

Further, in this embodiment, the host apparatus 3 comprises a path switching function, and is configured to enable the switching of the I/O access destination of applications. The path switching function, for example, is realized with a path switching manager that operates as a device driver.

The storage apparatus 4 comprises one or more logical volumes VOL to be I/O accessed by the host apparatus 3. The logical volume VOL is a "logical storage" capable of recognizing applications in the host apparatus 3. The logical volume VOL is formed in one or more physical devices PDEV as physical storage mediums that support data. As a typical embodiment, the logical volume VOL is formed in a physical device PDEV via a logical intermediate device. Specifically, from the perspective of enlarging capacity and improving reliability, the RAID (Redundant Arrays of Independent Disks) technology is used to define a virtual device VDEV in several physical devices PDEV. Subsequently, one or more logical devices LDEV are allocated to the virtual device VDEV, and a logical volume VOL is allocated to the respective logical devices LDEV. In other words, one logical volume VOL corresponds to one logical device LDEV. Nevertheless, the logical intermediate device is omitted to facilitate the understanding of the present invention, and the logical volume VOL will be explained as having been formed on a physical device PDEV.

The logical device LDEV is allocated with a logical device identifier (hereinafter referred to as a "LDEV ID"), and, therefore, the host apparatus 3 is able to use the LDEV ID and recognize the logical volume VOL. The LDEV ID is identifying information for identifying the logical device LDEV (i.e., logical volume VOL) to be managed for each disk controller 42 described later. In this embodiment, the LDEV ID is configured based on a combination of identifying information unique to the disk controller 42 and a logical device number of the logical device LDEV.

Further, the storage apparatus 4 comprises a remote copy (or mirroring) function for backing up data. The remote copy function copies data synchronously or asynchronously between the logical volumes VOL to which a pair relationship is defined. In synchronous remote copy, the storage primary apparatus 4 that received an I/O access from the host apparatus 3 writes data according to the I/O access in its own logical volume VOL, and request writing to the logical volume VOL of the backup (replication) storage apparatus 4 in a pair relationship, and, at the point in time that the writing in the backup storage apparatus 4 is complete, replies to the host apparatus 3 indicating the completion of the I/O access. Meanwhile, in asynchronous remote copy, copy is performed between the logical volumes VOL independently (asynchronously) with the I/O access from the host apparatus 3.

The storage apparatus 4 equipped with the remote copy function in this embodiment retains a virtual LDEV ID set so that it can claim to be the LDEV ID of the opponent's logical volume VOL to which a pair relationship is defined. The virtual LDEV ID set contains one's own LDEV ID (this is hereinafter referred to as a "real LDEV ID") and the opponent's LDEV ID (this is hereafter referred to as a "virtual LDEV ID"). Therefore, when switching from a primary storage apparatus to the logical volume VOL in the backup storage apparatus 4, the nondisruptive operation of applications is realized by succeeding the LDEV ID (this is the same as the virtual LDEV ID of the backup logical volume VOL) of the logical volume VOL in the primary storage apparatus 4.

The management device 5 is typically a versatile computer, and, although not shown, comprises hardware resources such as a CPU, a memory, an I/O device, and an I/F device, and software resources such as an OS and a management program. The management program, for example, provides a Web console to the system administrator, communicates with the storage apparatus 4 and controls the storage apparatus 4. For example, the system administrator is able to define a pair relationship of the logical volume VOL by using the Web console.

The auxiliary server 6 collects the virtual LDEV ID sets from all other storage apparatuses 4 on the network 2 in response to the LDEV ID acquisition request from a certain storage apparatus 4 on the network 2, creates a new virtual LDEV ID set therefrom, and returns the created virtual LDEV ID set to the storage apparatus 4 of the source of request. Thereby, even if the LDEV ID is reset due to initialization or the like, the storage apparatus 4 is able to acquire a LDEV ID that is consistent with the system configuration, and it will thereby be possible to realize an environment where logical volumes with different contents will not have the same LDEV ID.

Figure 2:
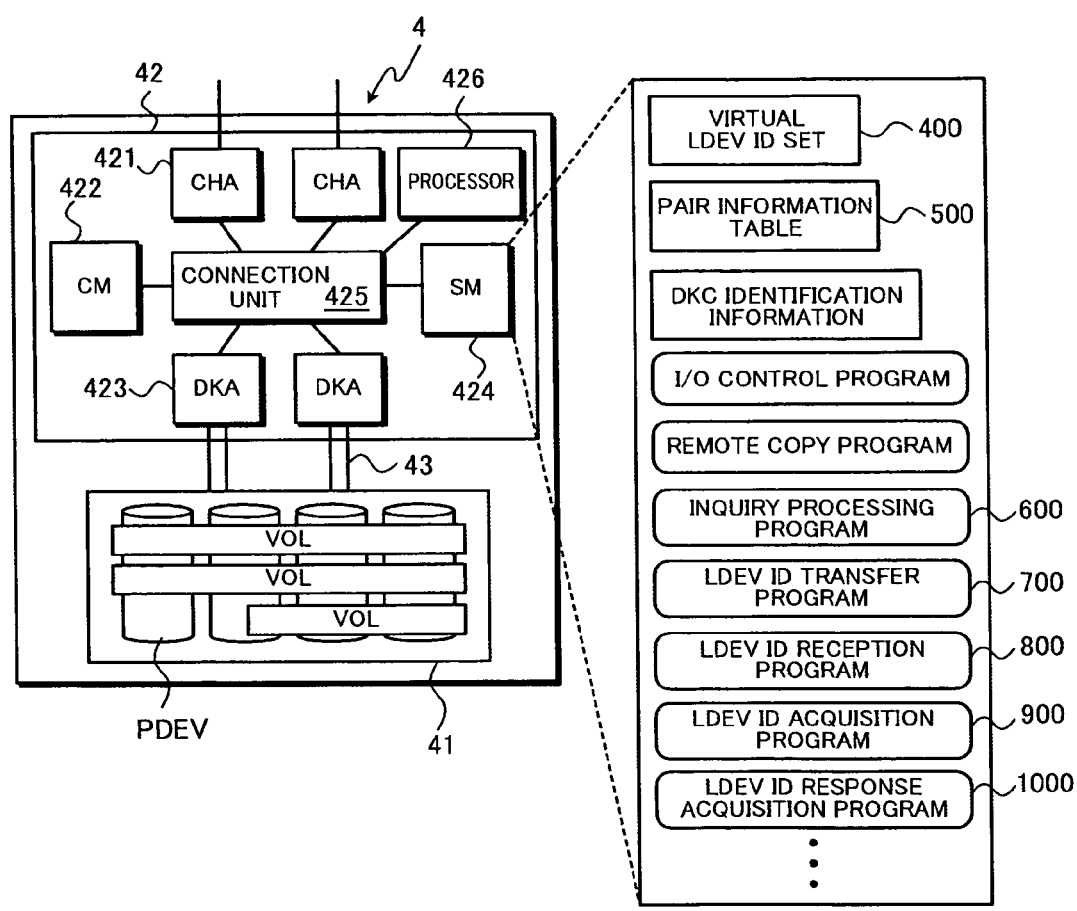
FIG. 2 is a diagram showing the configuration of a storage apparatus according to an embodiment of the present invention.

FIG. 2 is a diagram showing the configuration of the storage apparatus 4 according to an embodiment of the present invention. As shown in FIG. 2, the storage apparatus 4 comprises a plurality of disk drives 41 as physical devices PDEV, and a disk controller (DKC) 42 for controlling the I/O access such as writing or reading from the host apparatus 3 to the disk drive 41. The disk drive 41 and the disk controller 42 are connected via a disk channel 43.

The disk drive 41, for example, is configured from storage mediums such as a hard disk drive or a nonvolatile memory. The disk drive 41 forms a logical device LDEV in a virtual device VDEV formed by the RAID technology, and a logical volume VOL is allocated thereto. In FIG. 2, the virtual device VDEV and the logical device LDEV as logical intermediate devices are omitted.

The disk controller 42 comprises a channel adapter (CHA) 421, a cache memory (CM) 422, a disk adapter (DKA) 423, and a shared memory (SM) 424, and these modules and components are mutually connected via a connection unit 425. Further, the disk controller 42 comprises a processor 426 for governing the control of the disk controller 42. Incidentally, in FIG. 2, although these modules are indicated singularly, such modules may also be provided in a plurality by adopting a redundant configuration.

The channel adapter 421 has a plurality of ports (not shown), and is a system circuit that functions as a communication interface for conducting communication based on the I/O access with the host apparatus 3 connected to the ports via the network 2.

The cache memory 422 temporarily stores data to be exchanged between the host apparatus 3 and the disk drive 6 for providing high system performance to the host apparatus 3. In other words, the cache memory 422 is used for sending and receiving data between the channel adapter 421 and the disk adapter 423.

The disk adapter 423 is a component or a system circuit that has a plurality of ports (not shown), and functions as an interface for controlling the I/O access to the disk drive 41 connected to the ports via the disk channel 53. In other words, the disk adapter 423 extracts data from the cache memory 422, stores such data in a prescribed storage area (block) of a logical volume VOL formed in the disk drive 41, and further reads data from a prescribed storage area of the logical volume VOL and writes such data in the cache memory 422.

The shared memory 424 is a memory to be referred to by the respective modules in the storage apparatus 4, and is configured from a RAM, a ROM, a nonvolatile RAM, and the like. The shared memory 524, as shown in FIG. 2, stores system configuration information including a pair relationship definition table and a virtual LDEV ID set, as well as various programs. Further, in this embodiment, the shared memory 524 also retains identifying information (i.e. serial number or the like) unique to the disk controller 42.

The connection unit 425 includes a switching device configured from a crossbar switch or the like. The connection unit 425 arbitrates the competition of the input data signals, switches the path of the data signals, and creates a path with the module of the sender and the module of the receiver.

Figure 3:
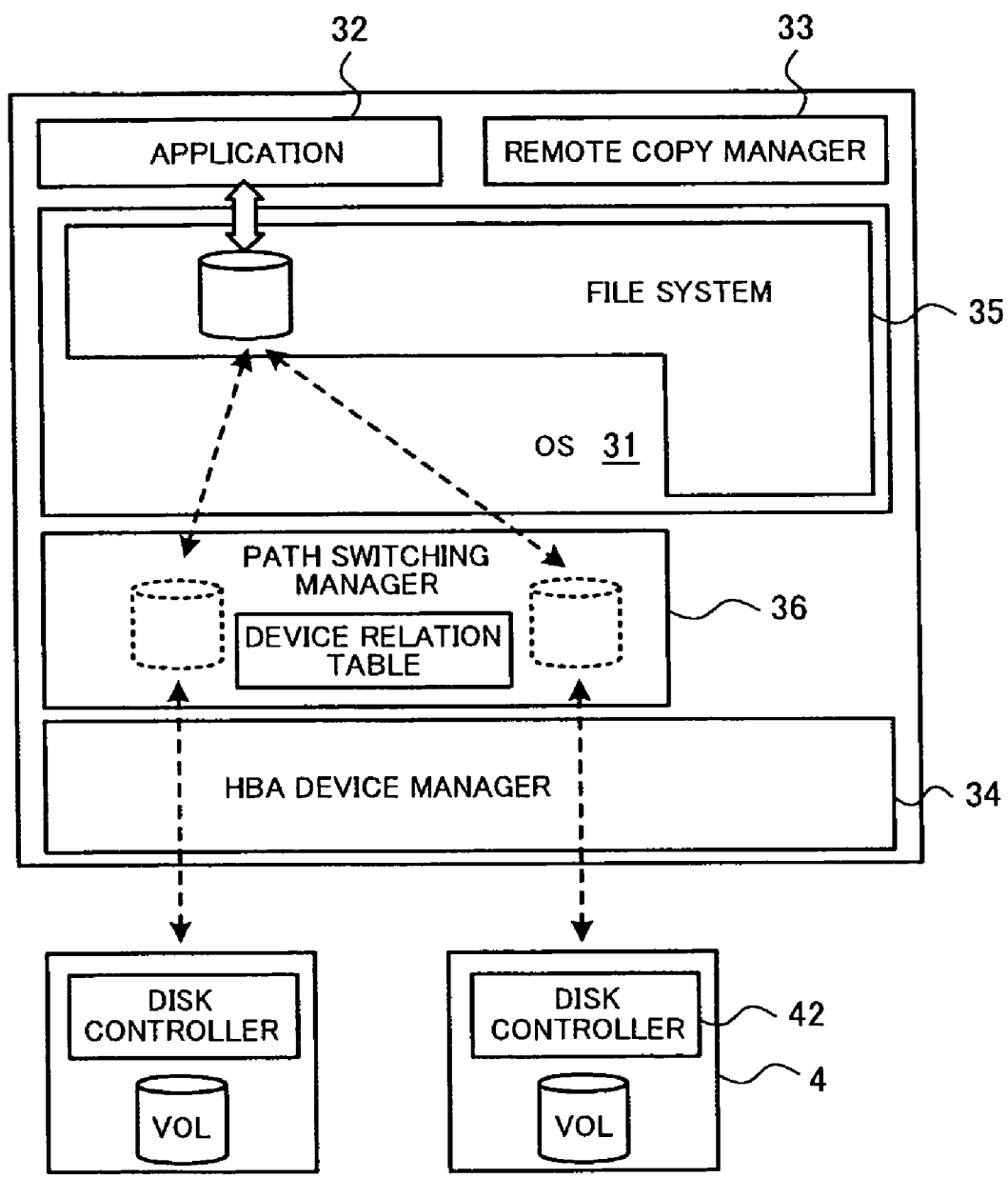
FIG. 3 is a conceptual diagram explaining a path switching function loaded in a host apparatus according to an embodiment of the present invention.

FIG. 3 is a conceptual diagram explaining the path switching function loaded in the host apparatus 3 according to an embodiment of the present invention. The path switching function, for example, is realized with a path switching manager that operates in the OS as a device driver.

The host apparatus 3, as described above, executes applications 32 in the OS 31 in order to realize desired business operations. The remote copy manager 33 is a program for managing the remote copy to be executed between the logical volumes VOL in the storage apparatus 4. This may be the same as the remote copy management program to be loaded in the management device 5, or may partially comprise its functions. The remote copy manager 33, for example, communicates with the storage apparatus 4 to acquire a remote copy status.

The HBA device driver 34 is a program for controlling the host bus adapter ("HBA") for the host apparatus 3 to communicate with the storage apparatuses 4. The HBA device driver 34, via HBA ports, sends an I/O access and the corresponding data to the target storage apparatus 4, or receives the data from the storage apparatus 4.

The file system 35 is a partial function provided by the OS 31, and intermediates the application 32 and the HBA device driver 34. In other words, the application 32 I/O accesses the virtual file (virtual volume) provided by the file system 25, and the file system 35 delivers the I/O access to the HBA device driver 34. However, in this embodiment, the path switching manager 36 is interposed between the file system 35 and the HBA device driver 34.

The path switching manager 36 is a program for switching the path (pathway) of the I/O access based on the application 32. Normally, a plurality of access paths for improving the reliability and performance are provided between the host apparatus 3 and the storage apparatus 4. In other words, programs of the host apparatus 3 enable the access to the logical volume VOL retained by the storage apparatus 4 to be made via a plurality of paths. The path switching manager 36 seeks the LDEV ID corresponding to the file identifier provided by the file system 35 from the device relationship table, and the path switching manager 36 that recognized the logical volume VOL having the LDEV ID sought on a plurality of paths selects one path among such paths and executes I/O access.

Figure 4:
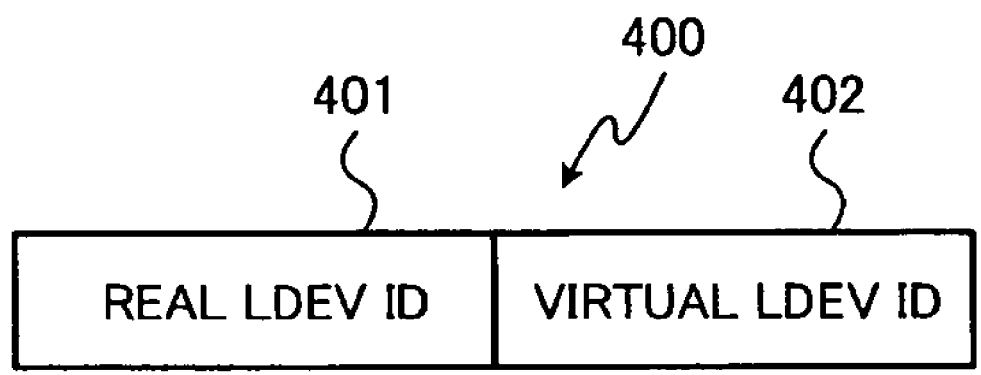
FIG. 4 is a diagram showing an example of a data format of a virtual LDEV ID set retained in the storage apparatus 4 according to an embodiment of the present invention.

FIG. 4 is a diagram showing an example of a data format of the virtual LDEV ID set 400 retained in the storage apparatus 4 according to an embodiment of the present invention. The disk controller 42 retains the virtual LDEV ID set 400 in a number that is the same as the number of logical volumes managed by the disk controller 42.

As shown in FIG. 4, the virtual LDEV ID set 400 is configured from a real LDEV ID 401 and a virtual LDEV ID 402. The real LDEV ID 401 is the normal LDEV ID of the logical volume VOL. The virtual LDEV ID 402 is the LDEV ID in which the storage apparatus 4 having a logical volume that responds to an inquiry request from the host apparatus 3.

Figure 5:
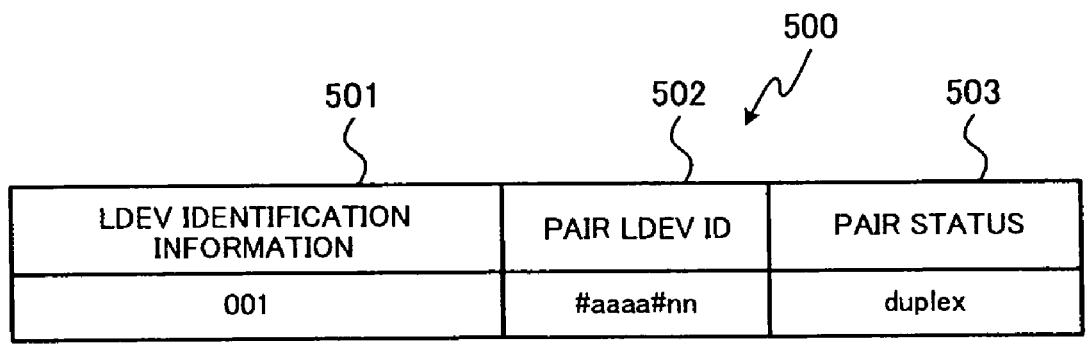
FIG. 5 is a diagram showing an example of a pair information table retained in the storage apparatus according to an embodiment of the present invention.

FIG. 5 is a diagram showing an example of a pair information table 500 retained in the storage apparatus 4 according to an embodiment of the present invention.

As shown in FIG. 5, the pair information table 500 includes LDEV identifying information 501, a pair LDEV ID 502, and a pair status 503. In other words, the pair information table 500 retains information for each logical device LDEV when a remote copy pair is defined in such logical device LDEV shown with the LDEV identifying information 501. The pair status 503 shows the status according to the remote copy pair status. A remote copy pair status, for example, is duplex, suspend and so on.

Figure 6:
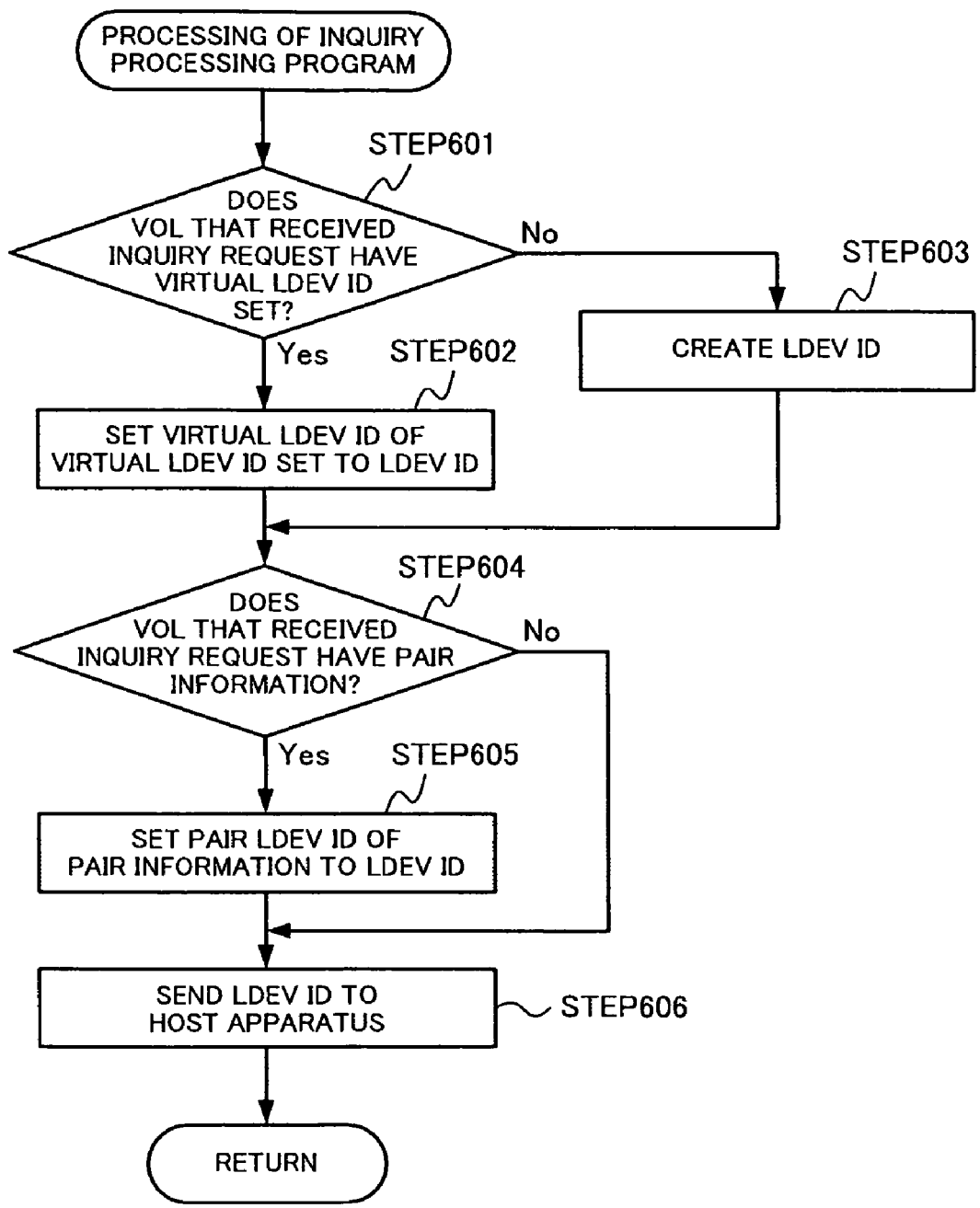
FIG. 6 is a flowchart explaining the processing of an inquiry processing program in the storage apparatus according to an embodiment of the present invention.

FIG. 6 is a flowchart explaining the processing of the inquiry processing program 600 in the storage apparatus 4 according to an embodiment of the present invention. When the host apparatus 3 sends an inquiry request to the storage apparatus 4 in order to recognize the logical volumes VOL under its control, the disk controller 42 of the storage apparatus 4 executes the inquiry processing program under the control of the processor 426 and sends a reply to the host apparatus 3.

As shown in FIG. 6, when the disk controller 42 receives an inquiry request from the host apparatus 3, it interprets such inquiry request and determines whether a virtual LDEV ID set is given to the logical volume VOL that received the inquiry request (STEP 601). When the disk controller 42 determines that a virtual LDEV ID set has been given to the logical volume VOL, it temporarily stores the value of the virtual LDEV ID 401 of the virtual LDEV ID set 400 as the LDEV ID of the logical volume VOL (STEP 602). In contrast, when the disk controller 42 determines that a virtual LDEV ID set has not been given to the logical volume VOL, it newly creates a LDEV ID based on its own unique identifying information and a logical device number of the logical device LDEV to provide the foregoing logical volume VOL (STEP 603).

The disk controller 42 subsequently refers to the pair information table 500 and determines whether there is a logical volume VOL defined as a pair with the foregoing logical volume VOL (STEP 604). This is to determine whether the LDEV ID of the logical volume VOL defined with a pair relationship is registered in the pair LDEV ID 502 of the logical device LDEV providing the foregoing logical volume VOL. When there is a logical volume VOL to which a pair relationship is defined, the disk controller 42 sets the value of the pair LDEV ID to the LDEV ID (STEP 605). Meanwhile, when there is no logical volume VOL to which a pair relationship is defined, the disk controller 42 leaves the LDEV ID to be the LDEV ID obtained at STEP 602 or STEP 603.

The disk controller 42 thereafter sends the obtained LDEV ID to the host apparatus 3 (STEP 606).

By way of this, by executing the inquiry processing program, the disk controller 42 will return the virtual LDEV ID 402 to the host apparatus 3 when only a virtual LDEV ID is allocated to the logical volume VOL. When that "role" is succeed from the primary logical volume VOL to the backup logical volume VOL and the pair relationship is cancelled, the logical volume VOL that was a backup logical volume VOL will become a status where only the virtual LDEV ID is allocated.

Figure 7:
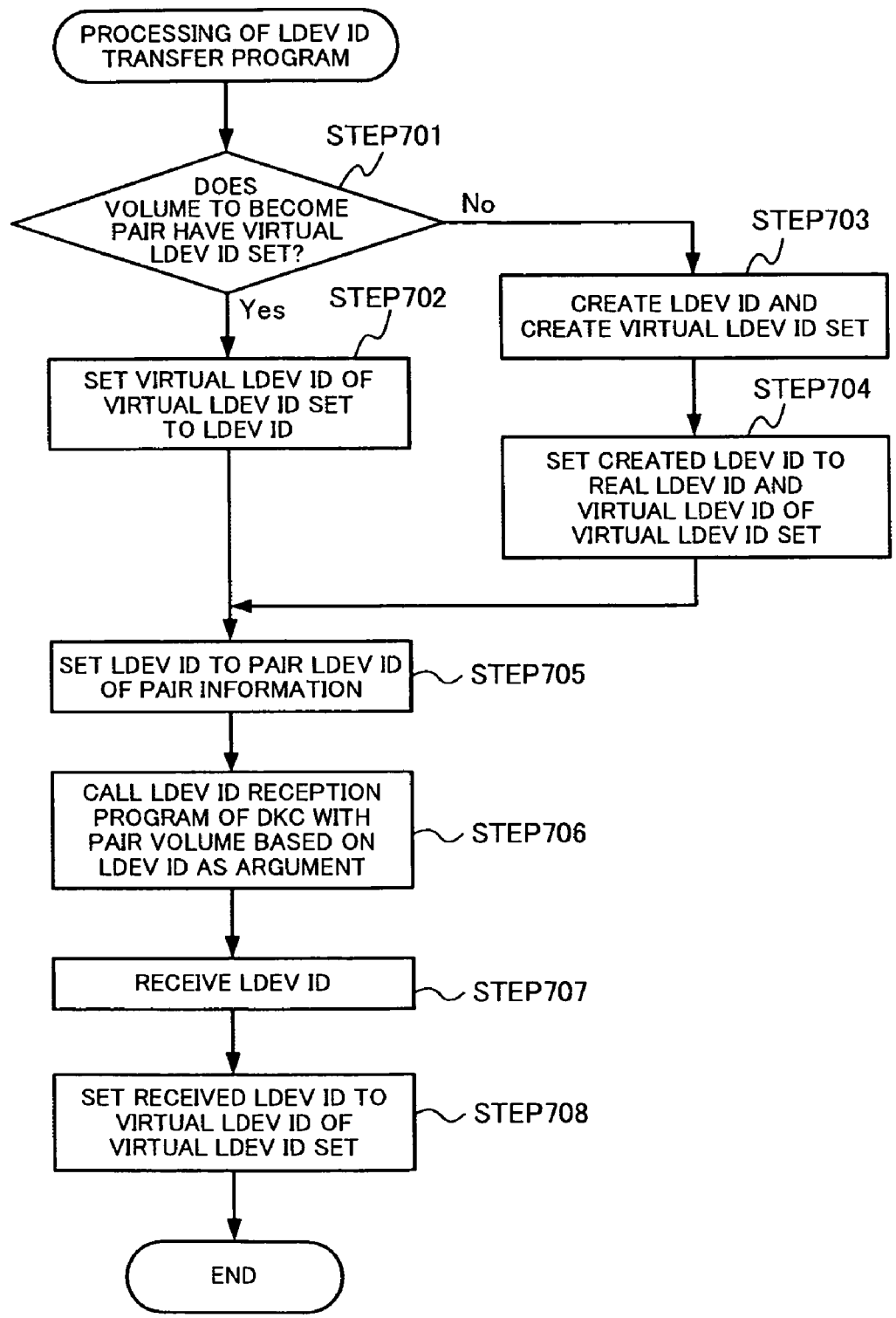
FIG. 7 is a flowchart explaining the processing of a LDEV ID transfer program in the storage apparatus according to an embodiment of the present invention.

FIG. 7 is a flowchart explaining the processing of the LDEV ID transfer program 700 in the storage apparatus 4 according to an embodiment of the present invention. The disk controller 42 of the storage apparatus 4 calls and executes the LDEV ID transfer program in the pair creation processing based on a pair creation command received from the management device 5 or the like.

Specifically, as shown in FIG. 7, the disk controller 42 to execute the LDEV ID transfer program 700 called in the pair creation processing foremost determines whether a virtual LDEV ID set 400 has been given to the logical volume VOL to which a pair relationship is defined (STEP 701). When the disk controller 42 determines that a virtual LDEV ID set 400 has been given to the foregoing logical volume VOL, it sets the value of the virtual LDEV ID 402 in the virtual LDEV ID set 400 to the LDEV ID (STEP 702).

When the disk controller 42 determines that a virtual LDEV ID set 400 has not been given to the foregoing logical volume VOL, it creates a LDEV ID based on its own unique identifying information and a logical device number of the logical device LDEV to provide the foregoing logical volume VOL, and newly creates a virtual LDEV ID set 400 (STEP 703). Subsequently, the disk controller 42 sets the value of the created LDEV ID respectively to the real LDEV ID 401 and the virtual LDEV ID 402 in the virtual LDEV ID set 400 (STEP 704).

After the LDEV ID has been obtained at STEP 702 or STEP 703, the disk controller 42 sets the value of the foregoing LDEV ID to the pair LDEV ID 502 of the corresponding LDEV number in the pair information table 500 (STEP 705), and thereafter communicates with the disk controller 42 (disk controller 42 of a pair relationship) of the storage apparatus 4 having a logical volume VOL to which a pair relationship is defined with the foregoing LDEV ID as the argument. Specifically, the foregoing disk controller 42 calls the LDEV ID reception program 800 to be executed by the disk controller 42 of a pair relationship with the LDEV ID as the argument (STEP 706). Thereby, the foregoing disk controller 42 will receive the LDEV ID sent from the LDEV ID reception program to be executed by the disk controller 42 of a pair relationship (STEP 707). The disk controller 42 thereafter sets value of the received LDEV ID to the virtual LDEV ID 402 in the virtual LDEV ID set 400 (STEP 708).

Figure 8:
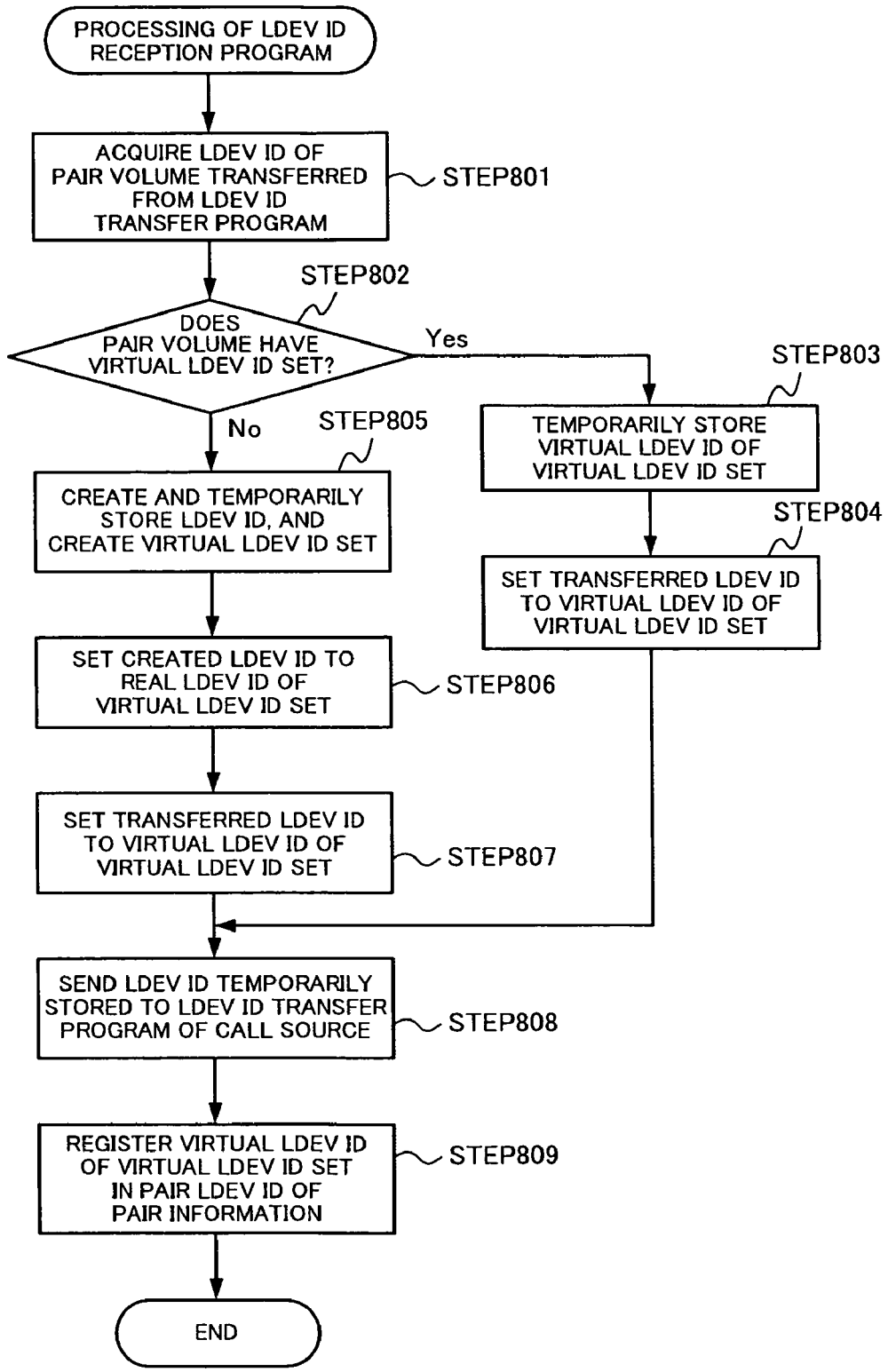
FIG. 8 is a flowchart explaining the processing of a LDEV ID reception program in the storage apparatus according to an embodiment of the present invention.

FIG. 8 is a flowchart explaining the processing of the LDEV ID reception program 800 in the storage apparatus 4 according to an embodiment of the present invention. The disk controller 42 of the storage apparatus to provide the backup logical volume VOL to be defined as a pair relationship executes the LDEV ID reception program 800 when it is called by the LDEV ID transfer program 700.

In other words, as shown in FIG. 8, the disk controller 42 to execute the LDEV ID reception program acquires the LDEV ID of the logical volume VOL to which a pair relationship is being defined and which was transferred by the LDEV ID transfer program 700 (STEP 801). The disk controller 42 determines whether a virtual LDEV ID set 400 has been set to its own logical volume VOL to which a pair relationship is to be defined (STEP 802).

When the disk controller 42 determines that a virtual LDEV ID set 400 has been set to its own logical volume VOL, it temporarily stores the value of the virtual LDEV ID 402 in the virtual LDEV ID set 400 as a work variable (STEP 803). The LDEV ID stored temporarily will become a reply to the called LDEV ID transfer program 700 as described later. Subsequently, the disk controller 42 sets the value of the transferred LDEV ID to the virtual LDEV ID 402 in the virtual LDEV ID set 400 (STEP 804).

When the disk controller 42 determines that a virtual LDEV ID set 400 has not been set to its own logical volume VOL, it creates a LDEV ID based on its own unique identifying information and a logical device number of the logical device LDEV to provide the foregoing logical volume VOL, and temporarily stores this as a work variable, and newly creates a virtual LDEV ID set 400 (STEP 805). Subsequently, the disk controller 42 sets the value of the created LDEV ID to the real LDEV ID 401 in the virtual LDEV ID set 400 (STEP 806), and further sets the value of the transferred LDEV ID to the virtual LDEV ID 402 in the virtual LDEV ID set 400 (STEP 807). This implies that the logical volume VOL will be of a status where the virtual LDEV ID set 400 is given, and the real LDEV ID 401 in the virtual LDEV ID set 400 is set with its own LDEV ID, and the virtual LDEV ID 402 is set with the transferred LDEV ID.

After the value is set to the virtual LDEV ID set according to STEPS 803 and 804 or STEPS 805 to 807, the disk controller 42 sends the LDEV ID temporarily stored as the work variable at STEP 803 or STEP 805 to the LDEV ID transfer program of the call source (STEP 808).

Then, the disk controller 42 registers the value of the virtual LDEV ID 402 in the virtual LDEV ID set to the pair LDEV ID 502 of the corresponding LDEV number in the pair information table 500 (STEP 809).

In doing so, by executing the LDEV ID transfer program 700, communication with the LDEV ID reception program 800 is conducted, and the virtual LDEV ID 402 in the virtual LDEV ID set 400 given the logical volume VOL to which a pair relationship is defined will be switched (swapped). This implies that the virtual LDEV ID set 400 is of a mirror image relationship in the logical volume VOL to which a pair relationship is defined. In other words, the real LDEV ID 401 of the primary logical volume VOL is the same as the virtual LDEV ID 402 of the backup logical volume VOL, the virtual LDEV ID 402 of the primary logical volume VOL is the same as the real LDEV ID 401 of the backup logical volume VOL.

Further, with a logical volume VOL in a copy pair relationship, the pair LDEV ID 502 of the pair information table 500 associated with the primary logical volume VOL and the pair LDEV ID 502 of the pair information table 500 associated with the backup logical volume VOL will have the same value. Thus, the path switching manager 36 of the host apparatus 3 recognizes the primary logical volume VOL and the backup logical volume VOL as logical volumes VOL on a plurality of paths of a single logical volume VOL. When a failure occurs in the primary logical volume VOL to which a pair relationship is defined according to this embodiment, the host apparatus 3 uses the path switching function to switch the I/O access path to the backup logical volume VOL to be recognized as the same logical volume VOL. Thereby, I/O access to the backup logical volume VOL can be continued without disrupting the execution of applications.

Further, when switching to the backup logical volume VOL due to the occurrence of a failure or when switching to the backup logical volume VOL with the intention of changing the system configuration, the backup logical volume VOL will use the same LDEV ID as the one that was given to the primary logical volume VOL (i.e., the virtual LDEV ID 402 given to the backup logical volume VOL), the primary logical volume VOL will no longer be able to use its own LDEV ID (i.e., real LDEV ID 401).

As described above, since the primary logical volume VOL will have the virtual LDEV ID set 400 after the pair relationship is cancelled, it returns the virtual LDEV ID 402 of the virtual LDEV ID set 400 to the host apparatus 3. Although this LDEV ID is the LDEV ID originally used by the backup logical volume VOL, this the LDEV ID of the primary logical volume VOL is used in this case, there is no problem even when this LDEV ID is used in the primary logical volume VOL.

Here, when the foregoing storage apparatus 4 is initialized, since the contents of the virtual LDEV ID set will be initialized, it is necessary to give consideration so that there will be no conflict with the LDEV ID of the logical volume VOL of the other storage apparatuses 4 on the network 2. Under these circumstances, the storage apparatus 4 acquires a list of the virtual LDEV ID of the storage apparatus 4 connected to the network 2 from the auxiliary server 6, and decides the LDEV ID to be given to the newly independent logical volume VOL.

Figure 9:
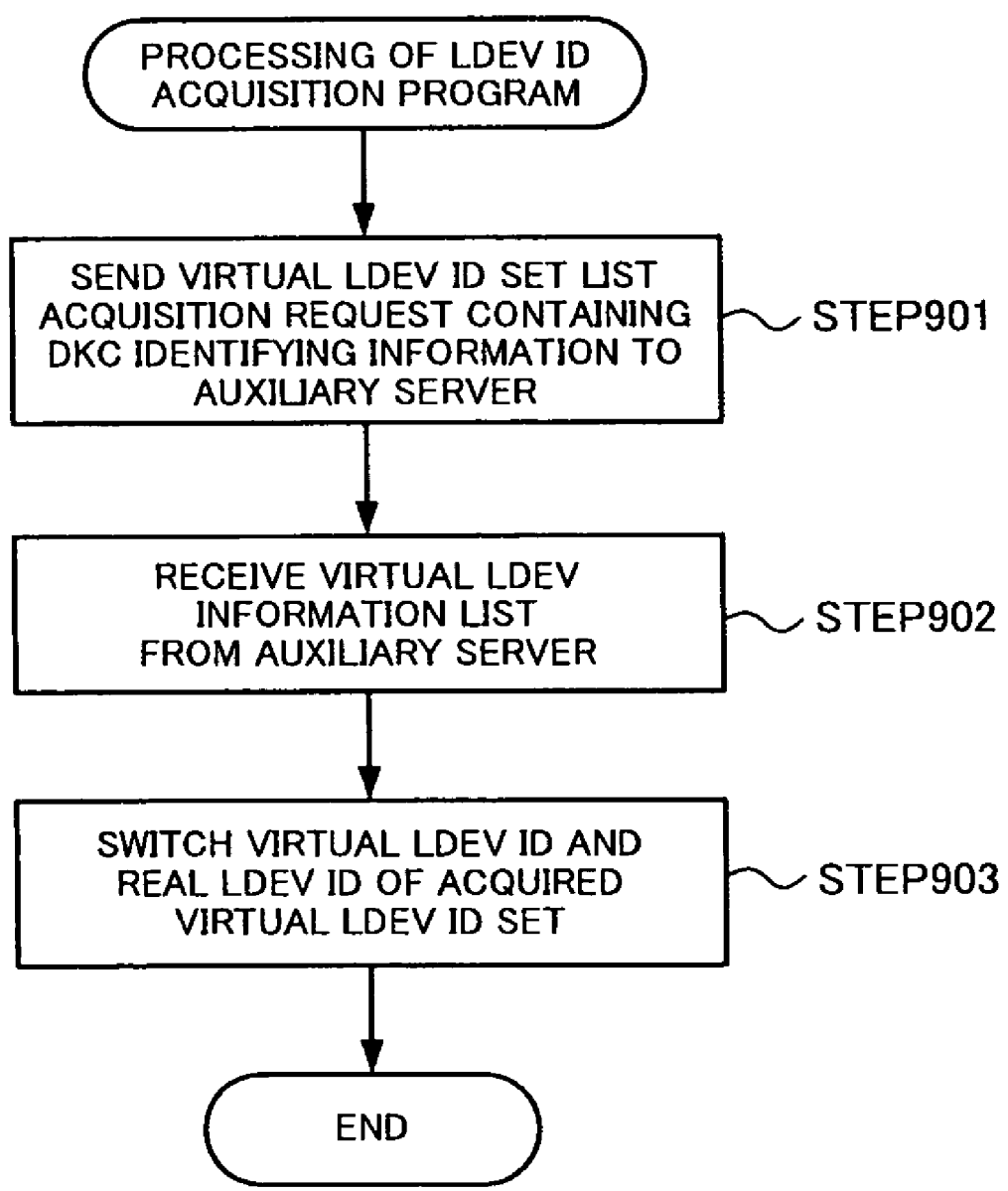
FIG. 9 is a flowchart explaining the processing of a LDEV ID acquisition program in the storage apparatus according to an embodiment of the present invention.

FIG. 9 is a flowchart explaining the processing of the LDEV ID acquisition program 900 in the storage apparatus 4 according to an embodiment of the present invention. The disk controller 42 of the storage apparatus 4, for instance, activates and executes the LDEV ID acquisition program 900 at the time the disk controller 42 is initialized.

As shown in FIG. 9, the disk controller 42 to execute the LDEV ID acquisition program 900 foremost sends an acquisition request of the virtual LDEV ID set list containing its own DKC identifying information to the auxiliary server 6 (STEP 901). The disk controller 42 receives the virtual LDEV ID set list sent in response to the request (STEP 902). Subsequently, the disk controller 42 swaps the value of the real LDEV ID 401 and the value of the virtual LDEV ID 402 in each virtual LDEV ID set 400 of the received virtual LDEV ID set list, and stores this as a new virtual LDEV ID set 400 in the shared memory 424 (STEP 903).

By way of this, the initialized disk controller 42 will be able to give a new LDEV ID to the logical volume VOL that it is managing.

Figure 10:
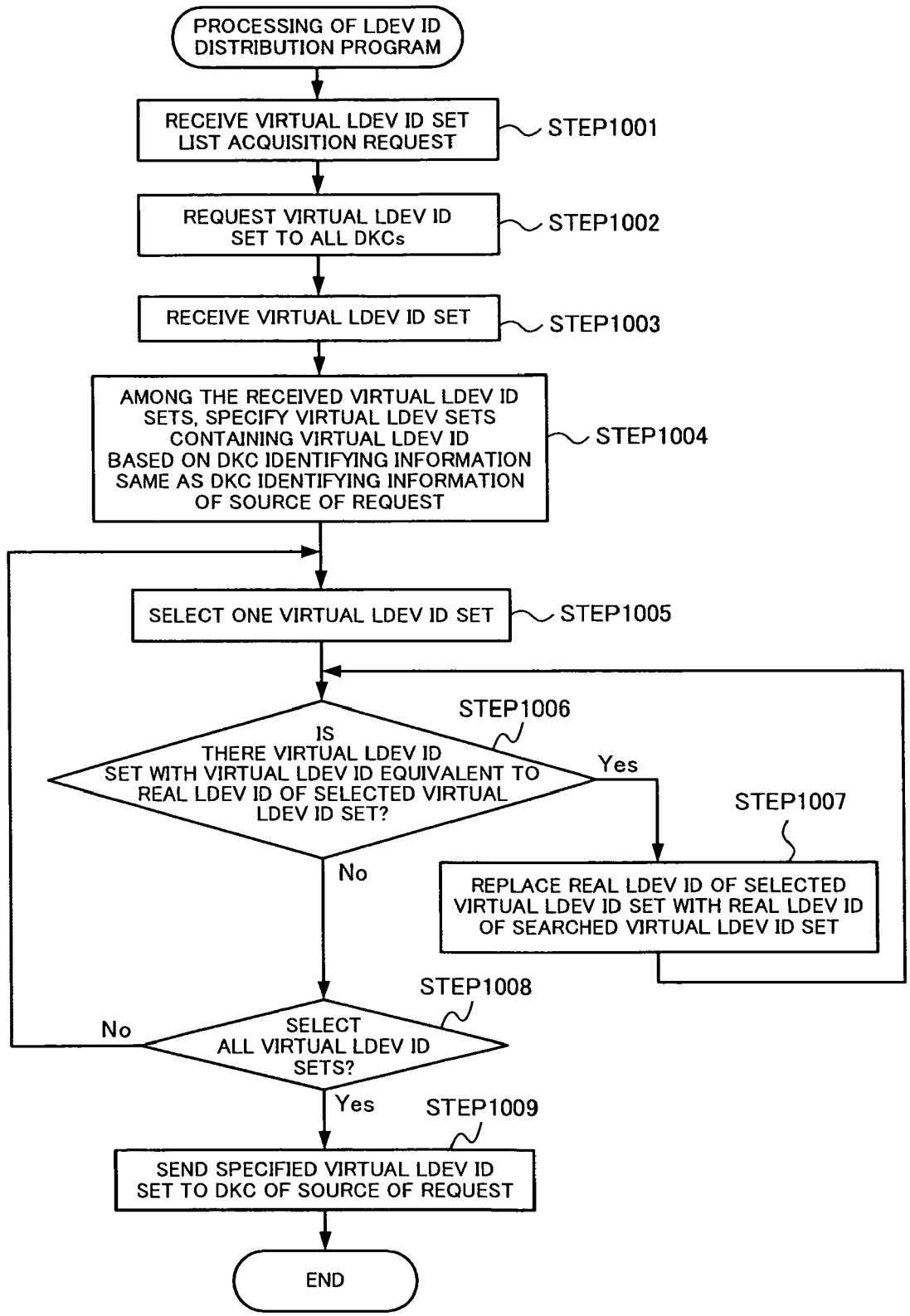
FIG. 10 is a flowchart explaining the processing of a LDEV ID distribution program in an auxiliary server according to an embodiment of the present invention.

FIG. 10 is a flowchart explaining the processing of the LDEV ID distribution program 1000 in the auxiliary server 6 according to an embodiment of the present invention.

As shown in FIG. 10, the auxiliary server 6 to execute the LDEV ID distribution program 1000 receives the acquisition request of the virtual LDEV ID set list from the LDEV ID acquisition program 900 to be executed by the disk controller 42 of the storage apparatus 4, and acquires the DKC identifying information of the foregoing disk controller 42 (STEP 1001). Then, the auxiliary server 6 sends a virtual LDEV ID set delivery request to all storage apparatuses 4 on the network 2 so as to send all virtual LDEV ID sets of its own disk controller 42 (STEP 1002).

The disk controller 42 of the storage apparatus 4 that received the virtual LDEV ID set delivery request executes the LDEV ID response program to send all of its virtual LDEV ID sets, and the auxiliary server 6 receives the sent virtual LDEV ID sets (STEP 1003).

Subsequently, among the received virtual LDEV ID sets, the auxiliary server 6 specifies the virtual LDEV ID set 400 including the virtual LDEV ID 402 containing the same DKC identifying information as the DKC identifying information of the disk controller 42 that sent the acquisition request of the virtual LDEV ID set list (STEP 1004). In other words, since the virtual LDEV ID 402 in the virtual LDEV ID set 400 is created from the combination of DKC identifying information and a logical device number of the logical device LDEV, the DKC identifying information is used as the search key.

Subsequently, the auxiliary server 6 sequentially selects the virtual LDEV ID set one by one from the specified virtual LDEV ID set 400 (STEP 1005), and performs the following processing.

Specifically, the auxiliary server 6 searches whether a virtual LDEV ID set 400 having the virtual LDEV ID 402 that is equivalent to the value of the real LDEV ID 401 in the selected virtual LDEV ID set 400 exists in the received virtual LDEV ID set list (STEP 1006). When the auxiliary server 6 determines that there is not coinciding virtual LDEV ID set 400, it proceeds to STEP 1008 in order to select the subsequent virtual LDEV ID set 400 from the specified virtual LDEV ID set 400.

When the auxiliary server 6 discovers virtual LDEV ID set 400 having the virtual LDEV ID 402 that is equivalent to the value of the real LDEV ID 401 in the selected virtual LDEV ID set 400 exists in the received virtual LDEV ID set list, it replaces the value of the real LDEV ID 401 in the selected virtual LDEV ID set 400 with the value of the real LDEV ID 401 of the discovered virtual LDEV ID set 400 (STEP 1007). The auxiliary server 6 thereafter returns to STEP 1006, and uses the virtual LDEV ID set 400 once again to search whether a virtual LDEV ID set 400 having the virtual LDEV ID 402 that is equivalent to the value of the real LDEV ID 401 (value has been replaced at STEP 1007) in the selected virtual LDEV ID set 400 exists in the received virtual LDEV ID set list, and, when a coinciding virtual LDEV ID set 400 is discovered, it similarly replaces the value of the real LDEV ID 401. This process is repeated until a coinciding virtual LDEV ID set 400 is no longer found.

After selected all specified virtual LDEV ID sets, the auxiliary server 6 sends the virtual LDEV ID set specified at STEP 1004 to the disk controller 42 of the storage apparatus 4 of the source of request (STEP 1009).

By way of this, the disk controller 42 of the storage apparatus 4 of the source of request will be able to obtain original information of the virtual LDEV ID set to be given to the new and independent logical volume VOL. Therefore, by swapping the value of the real LDEV ID in the virtual LDEV ID set sent from the auxiliary server 6 and the value of the virtual LDEV ID, the disk controller 42 is able to uniquely identify the foregoing logical volume VOL using the virtual LDEV ID set 400.

In this embodiment, although the disk controller 42 of the source of request swapped the value of the real LDEV ID in the virtual LDEV ID set sent from the auxiliary server 6 and the value of the virtual LDEV ID, the auxiliary server 6 may send the swapped virtual LDEV ID set 400 to the disk controller 42 of the source of request.

Specific Examples

Figure 11:
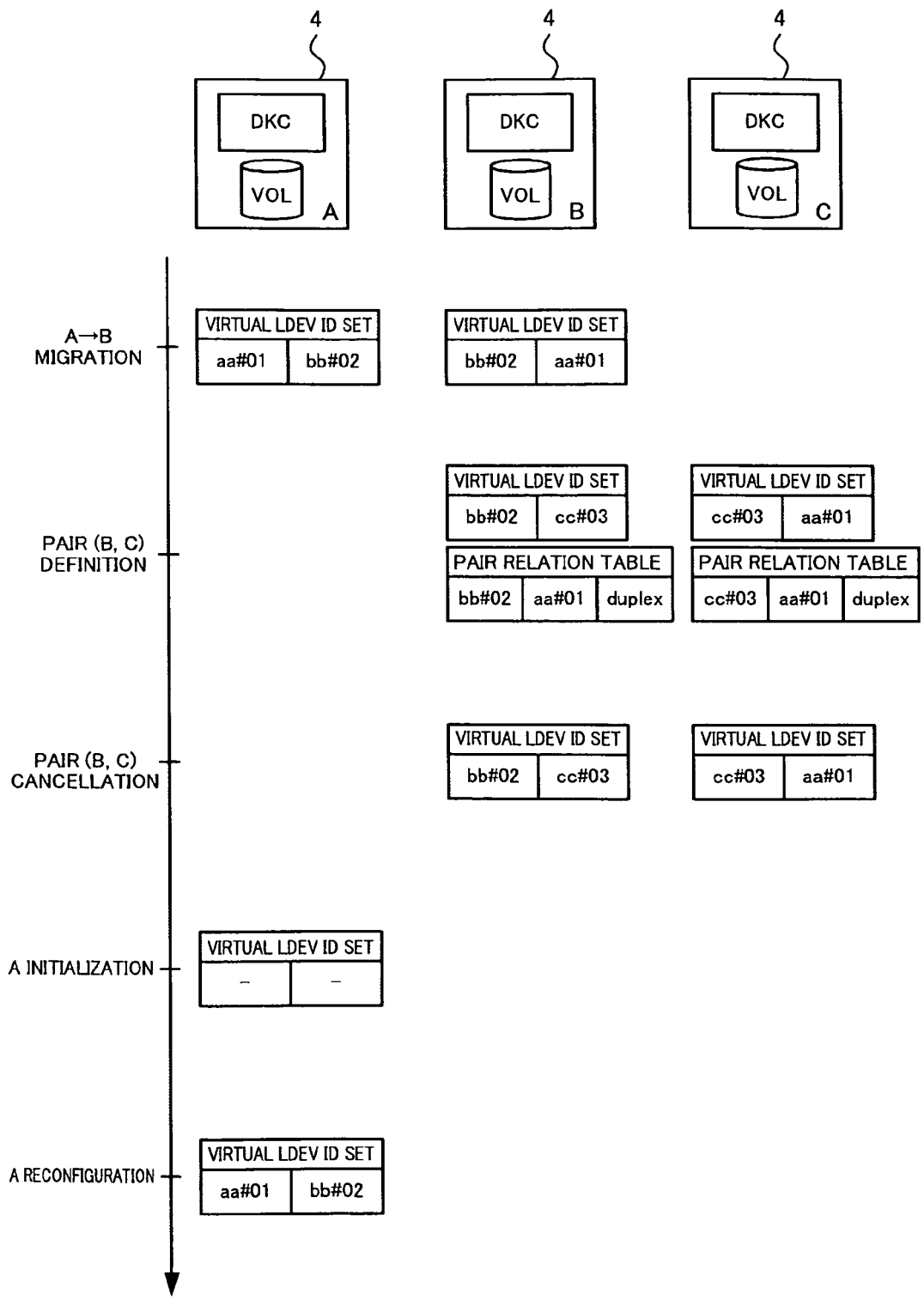
FIG. 11 is a diagram explaining the transition of contents of the virtual LDEV ID set and the pair information table in the storage apparatus according to an embodiment of the present invention.

Subsequently, a specific example of a case of changing the system configuration of the storage apparatus 4 according to an embodiment of the present invention is now explained. FIG. 11 is a diagram explaining the transition of contents of the virtual LDEV ID set 400 and the pair information table 500 in the storage apparatus 4 according to an embodiment of the present invention, and the status is shown in a time series.

In order to simplify the ensuing explanation, let it be assumed that the disk controller 42 of the respective storage apparatuses 4 is only providing a single logical volume VOL. Thereby, the "logical storage" to be recognized with the LDEV ID can be viewed as being equivalent to the storage apparatus 4. Thus, here, the storage apparatus 4 that provided a certain logical volume VOL is simply referred to as a "storage (i.e., storage A)."

As shown in FIG. 11, with a storage A and a storage B to which a pair relationship has already been defined, foremost, let it be assumed that the pair relationship has been cancelled, and the data of the storage A has been migrated to the storage B. Therefore, the virtual LDEV ID set 400 in each of the storages A and B will be as illustrated in FIG. 11. Specifically, the storage A and the storage B respectively retain the value of the opponent's real LDEV ID 401 as the value of its own virtual LDEV ID 402. At this point, the storage A is causing the host apparatus 3 to recognize the value "bb#02" of the virtual LDEV ID 402, and the storage B is causing the host apparatus 3 to recognize the value "aa#01" of the virtual LDEV ID 402, respectively.

Then, when a pair relationship is defined between the storage B and a storage C, the virtual LDEV ID set 400 of the storage B and the storage C will be similarly set to the state shown in FIG. 11. Further, the pair LDEV ID 502 of the pair information table 500 at such time will be the value "aa#01" of the virtual LDEV ID 402 in which the storage B caused the host apparatus 3 to recognize (refer to STEP 705 of FIG. 7 and STEP 809 of FIG. 8).

Subsequently, when the pair relationship of the storage B and the storage C is cancelled, the virtual LDEV ID set 400 in each of the storages B and C will be as illustrated in FIG. 11. In other words, since the pair relationship has been cancelled, the pair information table 500 is deleted.

In this status, if the storage A is initialized, all information retained by the storage A, excluding the DKC identifying information, will be reset. Thus, in order to reconfigure the original information, the storage A sends its DKC identifying information to the auxiliary server 6, and acquires the LDEV ID from the auxiliary server 6.

FIG. 12 is a diagram explaining the process of creating the virtual LDEV ID set 400 in the auxiliary server 6 according to an embodiment of the present invention.

Specifically, as shown in FIG. 12, foremost, when the auxiliary server 6 acquires the DKC identifying information of the storage A requesting acquisition, it calls the virtual LDEV ID sets 400 of all remaining storages (in this example, from the storage B and the storage C) (FIG. 12A).

The auxiliary server 6 subsequently specifies the virtual LDEV ID set having the virtual LDEV ID containing the same DKC identifying information as the acquired DKC identifying information. The auxiliary server 6 further selects one from the specified virtual LDEV ID set 400, and searches for the virtual LDEV ID set 400 having the same virtual LDEV ID 402 as the real LDEV ID 401 in the selected virtual LDEV ID set 400 from the collected virtual LDEV ID set list (FIG. 12B).

Subsequently, the auxiliary server replaces the real LDEV ID 401 of the selected virtual LDEV ID set 400 with the real LDEV ID 401 of the searched virtual LDEV ID set (FIG. 12C). In this example, since only two virtual LDEV ID sets were collected, the foregoing replacement processing will end here. Nevertheless, if there is still a virtual LDEV ID set that has not been selected, the foregoing replacement processing is repeated until all virtual LDEV IDs are selected.

The auxiliary server 6 thereafter sends the ultimately obtained virtual LDEV ID set 400 to the storage A of the source of request. The storage A of the source of request swaps the value of the real LDEV ID 401 in the sent virtual LDEV ID set 400 and the value of the virtual LDEV ID 402, and sets it in its own virtual LDEV ID set 400 (FIG. 12D).

Figure 13:
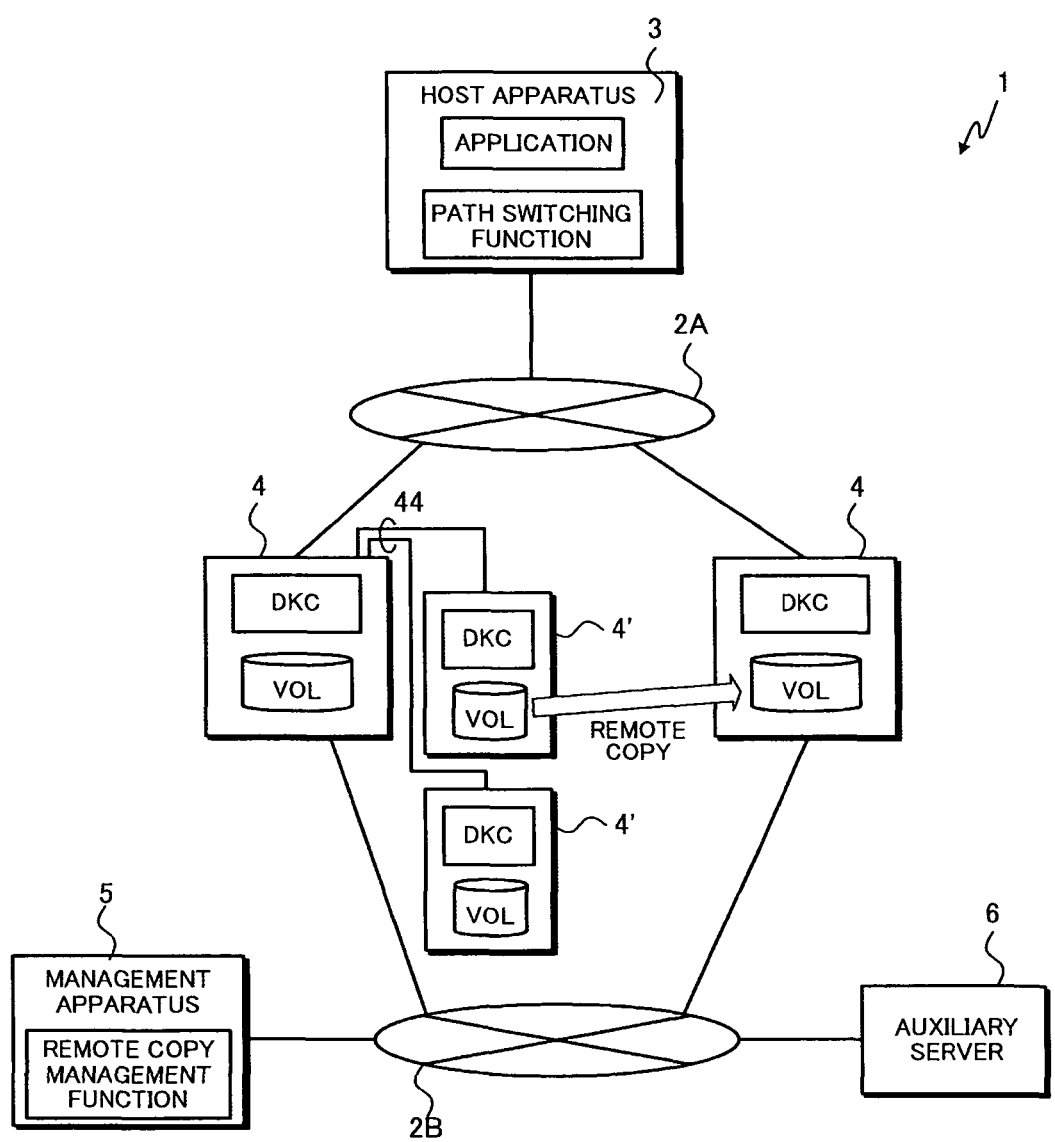
FIG. 13 is a diagram showing the configuration of a computer system according to another embodiment of the present invention.

Another embodiment of the present invention is now explained. FIG. 13 is a diagram showing the configuration of a computer system 1 according to another embodiment of the present invention.

The computer system according to this embodiment comprises a storage apparatus 4 adopting a configuration of connecting an external storage. Specifically, as with the foregoing embodiment, each storage apparatus 4 is connected to a host apparatus 3 via an I/O network 2A. Further, the storage apparatuses 4 are interconnected via a management network 2B. The management network 2B is also connected to a management device 5 and an auxiliary server 6. Nevertheless, one of the storage apparatuses 4 is connected to an external storage apparatus 4' via a channel 44. In other words, the external storage apparatus 4' functions as an external storage of the storage apparatus 4. The channel 44, for instance, is a channel based on a fibre channel protocol.

In the external storage connection configuration, the logical device LDEV (this is hereinafter referred to as an "external logical device LDEV-E") of the external storage apparatus 4' is deemed an external device of the storage apparatus 4, and cannot be recognized directly by the host apparatus 3. The storage apparatus 4 associates the external logical device LDEV-E with its own logical device LDEV (this is hereinafter referred to as an "internal logical device LDEV-I"), and thereby causes the host apparatus 3 to recognize the logical device LDEV (external logical device LDEV) of the external storage apparatus 4'. Accordingly, although the host apparatus 3 will only recognize the internal logical device LDEV-I provided by the storage apparatus 4, it is able to I/O access the logical volume VOL in the external logical device LDEV-E via the internal logical device LDEV-I without having to be aware of the external storage apparatus 4'.

Namely, the logical volume VOL of the external storage apparatus 4' connected to the storage apparatus 4, as with the foregoing embodiment, is given the LDEV ID created based on the DKC identifying information of the disk controller 42'. Therefore, as a result of the storage apparatus 4 providing the LDEV ID of the logical volume VOL of the external storage apparatus 4' to the host apparatus 3, the host apparatus 3 is able to recognize the foregoing logical volume VOL.

Further, when a pair relationship of remote copy is defined between the logical volumes VOL, when the host apparatus 3 I/O accesses the logical volume VOL in the primary storage apparatus 4 (or the logical volume VOL provided by the external storage apparatus 4'), based on the remote copy function, the primary storage apparatus 4 will transfer data accompanying the I/O access to the backup storage apparatus 4.

In this kind of external storage connection configuration, even when initializing the disk controller 42 of a certain storage apparatus 4, the system configuration can be changed without disrupting the execution of applications by similarly acquiring a new LDEV ID from the auxiliary server 6.

The foregoing embodiments are merely examples for explaining the present invention, and are not intended to limit the gist of this invention to the foregoing embodiments. The present invention may be worked in various modes within a range that does not deviate from the gist of this invention.

For instance, in the foregoing embodiments, although the auxiliary server 6 collected the virtual LDEV ID sets of all other storage apparatuses 4, created the virtual LDEV ID set, and sent a reply thereof according to the LDEV ID acquisition request of the storage apparatus 4, the present invention is not limited thereto. Some or all of the storage apparatuses on the network 2 may comprise the function of the auxiliary server 6.

Further, in addition to creating the virtual LDEV ID set based on the DKC identifying information, the auxiliary server 6 may also create the virtual LDEV ID set based on other identifying information to be differentiated from normal DKC identifying information. For example, a specific range of the DKC identifying information is defined as a reservation number to be used by the auxiliary server 6, and the auxiliary server 6 may use any one of the reservation numbers to create the virtual LDEV ID. By way of this, it will be possible to differentiate whether it is a LDEV ID derived from the disk controller 42 of the storage apparatus 4, or a LDEV ID created by the auxiliary server 6.

The present invention can be broadly applied to computer system including storage apparatuses that employ the remote copy technology.

What is claimed is:

1. A storage system comprising:

at least a first storage apparatus operatively coupled to a host apparatus;

a second storage apparatus operatively coupled to the host apparatus via the network; and an auxiliary server operatively connected to the first storage apparatus and the second storage apparatus, wherein the first storage apparatus comprises:

a first disk drive having a first logical device allocated with a first logical volume to be I/O accessed by the host apparatus; and a first disk controller configured to control the first disk drive, wherein the first disk controller includes first identification information for identifying the first disk controller, a first logical device identifier created based on the first identification information to allow the host apparatus to recognize the first logical device, and a first virtual/logical device identifier set containing a first real/logical device identifier and a first virtual/logical device identifier;

wherein the second storage apparatus comprises:

a second disk drive having a second logical device allocated with a second logical volume; and a second disk controller configured to control the second disk drive, wherein the second disk controller includes second identifying information for identifying the second disk controller, a second logical device identifier created based on the second identifying information to allow the host apparatus to recognize the second logical device, and a second virtual/logical device identifier set containing a second real/logical device identifier and a second virtual/logical device identifier, wherein the first real/logical device identifier and the first virtual/logical device identifier in the first virtual/logical device identifier set respectively correspond to the second virtual/logical device identifier and the second real/logical device identifier in the second virtual/logical device identifier set, wherein at least one of the first disk controller and the second disk controller sends to the auxiliary server a logical device identifier acquisition request for acquiring a new logical device identifier available on the network containing the identifying information of itself, and wherein the auxiliary server collects virtual/logical device identifier sets of disk controllers of other storage apparatuses from the storage apparatuses that have not sent the logical device identifier acquisition request on the network according to the logical device identifier acquisition request, creates a new virtual/logical device identifier set based on the identifying information contained in the logical device identifier acquisition request and the collected virtual/logical device identifier set, and sends the created virtual/logical device identifier set to any one of the disk controllers that sent the logical device identifier acquisition request.

2. The storage system according to claim 1, wherein the second disk controller causes the host apparatus to recognize the second virtual/logical device identifier for the host apparatus to switch the I/O access from the first logical volume to the second logical volume.

3. The storage system according to claim 1, wherein the first disk controller sets the first logical device identifier to a first virtual/logical device identifier in the first virtual/logical device identifier set, and sends the first logical device identifier to the second disk controller when the first logical volume and the second logical volume are defined as a pair relationship regarding remote copy; and wherein the second disk controller sets the sent first logical device identifier to the second virtual/logical device identifier in the second virtual/logical device identifier set, and sends the second virtual/logical device identifier to the first disk controller.

4. The storage system according to claim 1, wherein the first identifying information and the second identifying information are serial numbers unique respectively to the first disk controller and the second disk controller.

5. The storage system according to claim 4, wherein the first disk controller creates the first logical device identifier based on the first identifying information and a first logical device number allocated to the first logical device, and wherein the second disk controller creates the second logical device identifier based on the second identifying information and a second logical device number allocated to the second logical device.

6. The storage system according to claim 1, wherein the auxiliary server specifies a virtual/logical device identifier set containing a virtual/logical device identifier based on identifying information that is the same as the identifying information contained in the logical device identifier acquisition request among the collected virtual/logical device identifier sets, selects another virtual/logical device identifier set containing a virtual/logical device identifier that is the same as a virtual/logical device identifier in the specified virtual/logical device identifier set, and replaces a real/logical device identifier in the specified virtual/logical device identifier set with a real/logical device identifier of the selected virtual/logical device identifier set.

7. The storage system according to claim 6, wherein one of the disk controllers that received the virtual/logical device identifier set created by the auxiliary server switches a real/logical device identifier and a virtual/logical device identifier in the virtual/logical device identifier set.

8. The storage system according to claim 1, wherein at least either the first storage apparatus or the second storage apparatus is connected to an external storage apparatus having an external logical device allocated with a logical volume.

9. A method of managing a storage system including at least a first storage apparatus and a second storage apparatus operatively respectively connected to a host apparatus via a network, wherein the first storage apparatus comprises a first disk drive having a first logical device allocated with a first logical volume to be I/O accessed by the host apparatus and a first disk controller having first identifying information for identifying the first disk controller and configured to control the first disk drive, and wherein the second storage apparatus comprises a second disk drive for forming a second logical device allocated with a second logical volume and a second disk controller having second identifying information for identifying the second disk controller and configured to control the second disk drive, the method comprising:

creating a first logical device identifier based on the first identifying information and according to an inquiry request sent from the host apparatus;

creating a first virtual/logical device identifier set containing a real/logical device identifier and a virtual/logical device identifier for defining a pair relationship regarding remote copy between the first logical volume and the second logical volume;

setting the created first logical device identifier as a real/logical device identifier in the first virtual/logical device identifier set;

sending the created first logical device identifier to the second disk controller;

creating a second logical device identifier based on the second identifying information;

receiving the second logical device identifier sent from the second disk controller based on the sent first logical device identifier;

setting the received second logical device identifier to a virtual/logical device identifier in the first virtual/logical device identifier set;

creating a virtual/logical device identifier set containing a real/logical device identifier and a virtual/logical device identifier;

setting the created second logical device identifier to the real/logical device identifier of the created virtual/logical device identifier set;

setting the first logical device identifier sent from the first disk controller to a virtual/logical device identifier of the created virtual/logical device identifier set; and sending the created second logical device identifier to the first disk controller.

10. The method according to claim 9, wherein the first disk controller creates the first logical device identifier based on a first logical device number allocated to the first identifying information and the first logical device, and the second disk controller creates the second logical device identifier based on a second logical device number allocated to the second identifying information and the second logical device.

11. A method of managing a storage system including at least a first storage apparatus and a second storage apparatus operatively respectively connected to a host apparatus via a network, and an auxiliary server operatively connected to the first storage apparatus and the second storage apparatus, wherein the first storage apparatus comprises a first disk drive having a first logical device allocated with a first logical volume to be I/O accessed by the host apparatus and a first disk controller having first identifying information for identifying the first disk controller and configured to control the first disk drive, and wherein the second storage apparatus comprises a second disk drive for forming a second logical device allocated with a second logical volume and a second disk controller having second identifying information for identifying the second disk controller and configured to control the second disk drive, the method comprising:

creating a first logical device identifier based on the first identifying information and according to an inquiry request sent from the host apparatus;

creating a first virtual/logical device identifier set containing a real/logical device identifier and a virtual/logical device identifier for defining a pair relationship regarding remote copy between the first logical volume and the second logical volume;

setting the created first logical device identifier as a real/logical device identifier in the first virtual/logical device identifier set;

sending the created first logical device identifier to the second disk controller;

receiving the second logical device identifier sent from the second disk controller based on the sent first logical device identifier;

setting the received second logical device identifier to a virtual/logical device identifier in the first virtual/logical device identifier set;

sending, under control of at least one of the first disk controller and the second disk controller, the auxiliary server a logical device identifier acquisition request for acquiring a new logical device identifier available on the network containing the identifying information of itself;

collecting virtual/logical device identifier sets of disk controllers of other storage apparatuses from the storage apparatuses that have not sent the logical device identifier acquisition request on the network according to the logical device identifier acquisition request;

creating a new virtual/logical device identifier set based on the identifying information contained in the logical device identifier acquisition request and the collected virtual/logical device identifier set; and sending the created virtual/logical device identifier set to any one of the disk controllers that sent the logical device identifier acquisition request.

12. The method according to claim 11, the method further comprising:

specifying a virtual/logical device identifier set containing a virtual/logical device identifier based on identifying information that is the same as the identifying information contained in the logical device identifier acquisition request among the collected virtual/logical device identifier sets;

selecting another virtual/logical device identifier set containing a virtual/logical device identifier that is the same as a virtual/logical device identifier in the specified virtual/logical device identifier set; and replacing a real/logical device identifier in the specified virtual/logical device identifier set with a real/logical device identifier of the selected virtual/logical device identifier set.

13. The method according to claim 12, the method further comprising:

swapping, under control of one of the disk controllers that received the virtual/logical device identifier set created by the auxiliary server, a real/logical device identifier and a virtual/logical device identifier in the virtual/logical device identifier set.

* * * * *